US005502292A

United States Patent [19]

Pernicka et al.

[11] Patent Number: 5,502,292
[45] Date of Patent: Mar. 26, 1996

[54] METHOD FOR LASER WELDING ULTRA-THIN METAL FOILS

[75] Inventors: John C. Pernicka, Fort Collins; David K. Benson; C. Edwin Tracy, both of Golden, all of Colo.

[73] Assignee: Midwest Research Institute, Kansas City, Mo.

[21] Appl. No.: 285,819

[22] Filed: Aug. 4, 1994

[51] Int. Cl.$^6$ .................................................. B23K 26/00
[52] U.S. Cl. .................................. 219/121.64; 219/121.63
[58] Field of Search ........................... 219/121.6, 121.63, 219/121.64, 121.72

[56] References Cited

U.S. PATENT DOCUMENTS

| | | | |
|---|---|---|---|
| 4,500,382 | 2/1985 | Foster | 156/272.8 |
| 4,533,814 | 8/1985 | Ward | 219/121 LD |
| 4,546,230 | 10/1985 | Sasaki et al. | 219/121 LD |
| 4,564,736 | 1/1986 | Jones et al. | 219/121 L |
| 4,798,931 | 1/1989 | Hess, III | 219/121.64 |
| 4,828,523 | 5/1989 | Fendey et al. | 219/121.63 |
| 4,905,310 | 2/1990 | Ulrich | 219/121.64 |
| 4,945,203 | 7/1990 | Soodak et al. | 219/121.64 |
| 5,013,275 | 5/1991 | Kautz | 219/121.63 |
| 5,187,967 | 2/1993 | Singh et al. | 72/340 |

FOREIGN PATENT DOCUMENTS

| | | | |
|---|---|---|---|
| 61-279385 | 12/1986 | Japan | 219/121.64 |
| 62-203694 | 9/1987 | Japan | 219/121.64 |
| 4-99207 | 3/1992 | Japan | 219/121.64 |

*Primary Examiner*—Teresa J. Walberg
*Assistant Examiner*—J. Pelham
*Attorney, Agent, or Firm*—Edna M. O'Connor

[57] ABSTRACT

A method for simultaneously cutting and welding ultra-thin foils having a thickness of less than 0.002 inches wherein two ultra-thin films are stacked and clamped together. A pulsed laser such as of the Neodymium: YAG type is provided and the beam of the laser is directed onto the stacked films to cut a channel through the films. The laser is moved relative to the stacked foils to cut the stacked foils at successive locations and to form a plurality of connected weld beads to form a continuous weld.

19 Claims, 1 Drawing Sheet

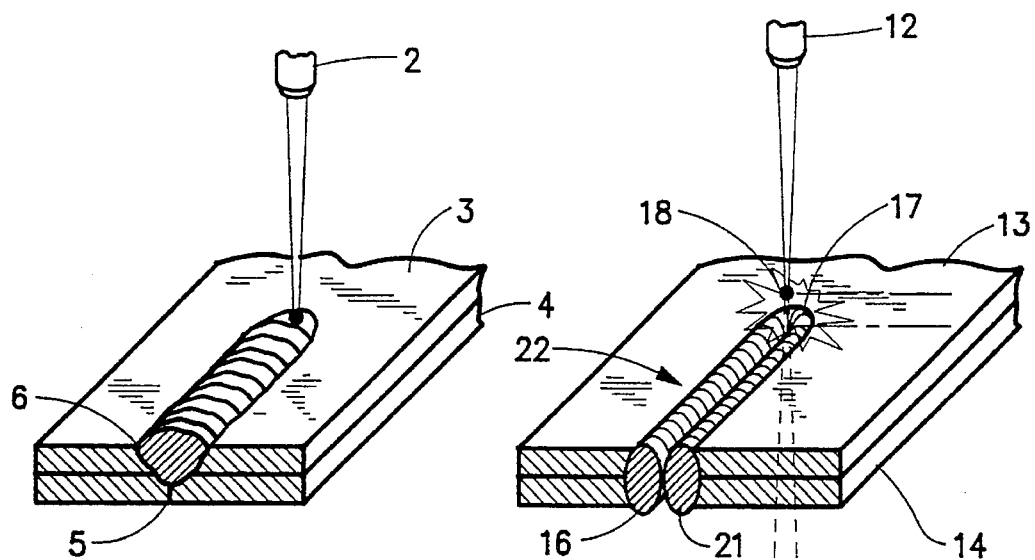
Fig.1 (PRIOR ART)
Fig.2
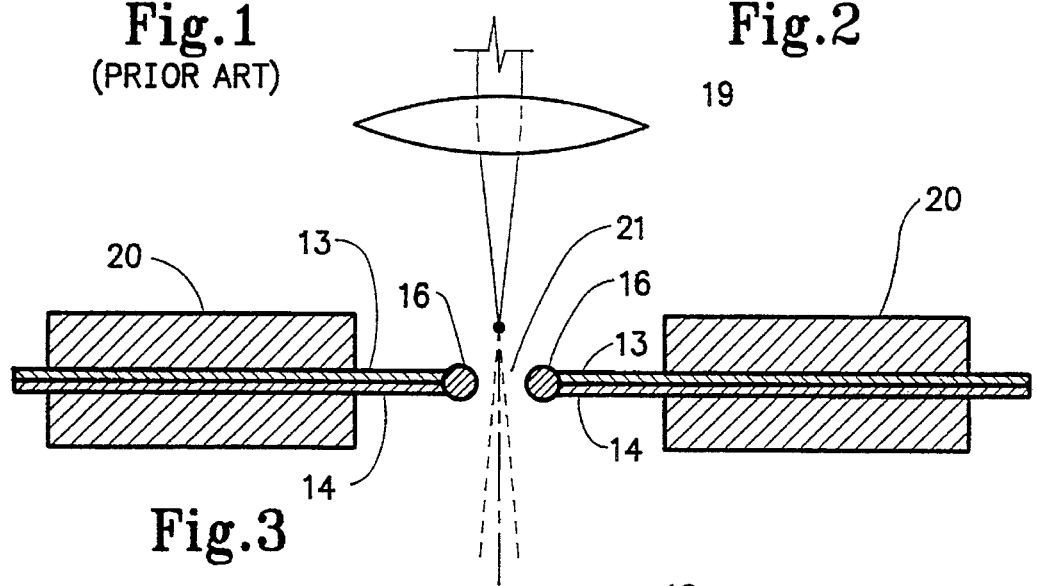
Fig.3
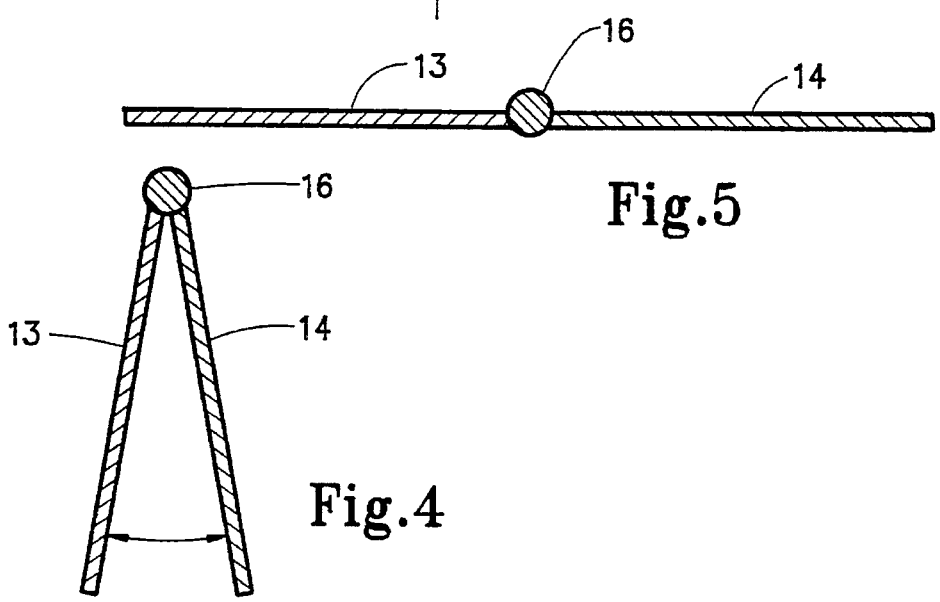
Fig.5
Fig.4

METHOD FOR LASER WELDING ULTRA-THIN METAL FOILS

The United States Government has rights in this invention under Contract No. DE-AC36-83CH10093 between the United States Department of Energy and the National Renewable Energy Laboratory, a division of the Midwest Research Institute.

BACKGROUND OF THE INVENTION

The instant invention is directed to a method for laser welding very thin foils or metals to achieve a vacuum tight seal. The method of the instant invention can also be used for welding foil seals for hydraulic and pneumatic systems. The method is specifically directed to the welding of metal foils which are less than 0.002 inches thick. Using the teachings of the instant invention the thin or ultra-thin metal foils are welded together using a laser welding and cutting operation. That is, the foils are welded while they are simultaneously trimmed, preferably by a pulsed laser, such as of the Neodymium:YAG type.

It is well recognized that the welding of metal foils having a thickness of less than 0.002 inches cannot be achieved using conventional laser welding methods. In fact, the prior art specifically teaches away from using a laser to achieve such thin metal welding. For example, U.S. Pat. No. 4,798,931, to Hess, III directed to "Simultaneously Cutting and Welding Sheet Metal Using Laser Energy", specifically states that the laser welding method of the patent "will not operate with extremely thin layers, and the patent is directed to metals with a range of thickness from 0.002 to 0.010 inches thick." Other prior patents recognize the difficulties encountered by welding even thicker metals. U.S. Pat. No. 4,546,230 to Sasaki displays graphically that the "welding of metal pieces is difficult unless the thickness thereof is 0.2 mm (0.008 inches) or above," (column 5). Similarly, U.S. Pat. No. 4,905,310 to Ulrich recognizes that a laser cannot be used to weld and cut very thin sheets and foils of metal because "such extremely thin layers may vaporize and/or curl and not function properly", (column 5).

Electrical resistance welding processes have also, in the past, been used for the welding of metal, but again such processes have proven suitable only for metal of a thickness of 0.003 inches or greater. Also, laser welding is preferred over electrical resistance welding as such a method would be more economical and more likely to provide a thicker, stronger, vacuum-tight, and error-free weld.

In the past, laser technology has been used with plastic and resin films. Such films have been simultaneously cut and welded using laser techniques. Although a laser has been successfully used with such materials, there is no suggestion in the prior art that the successful welding and cutting of very thin metal foils can be achieved by using similar methods. U.S. Pat. No. 4,945,203 to Soodak et al is an example of the use of a laser to simultaneously cut and weld film plastic bags. The reference uses a carbon-dioxide type laser to weld Teflon brand films having a thickness on the order of 0.001 inch to 0.10 inch. Even with the knowledge of the Soodak et al reference it is well known that the success of the method is limited to a plastic type of material and would not be successfully extended to very thin metal foils, as plastic materials have physical and chemical properties which are extremely different from those of metals. For example, plastics can be cut or welded in air at relatively low temperatures, whereas metals require much elevated temperatures. Metals further have a more complex polycrystalline structure and more complex processing parameters.

Similarly, U.S. Pat. No. 4,500,382 to Foster describes a method using a laser for simultaneously cutting resin film to the desired shape while simultaneously welding the edges. Again the prior art recognizes that such a method does not extend to very thin metal foils and teaches away from trying such a method with thin foil material.

Neodymium: YAG lasers and other solid state lasers, such as those suitable for use in the process of the instant invention, are well known and have been used for welding and cutting. U.S. Pat. No. 4,461,947 to Ward shows the use of such a laser for a similar purpose, but not for the simultaneous cutting and welding of very thin or ultra-thin foils. U.S. Pat. No. 4,564,736 to Jones discloses the use of a Neodymium: YAG laser in cutting, drilling, and welding processes, and U.S. Pat. No. 5,187,967 to Singh et al also discloses the use of a Neodymium: YAG laser for cutting. Again, none of the above cited patents utilize such a solid state laser for the simultaneous welding and cutting of very thin metal foils. None of the references recognize that such a procedure can be achieved through the use of a laser.

It is recognized that simultaneous cutting and welding can be achieved utilizing laser technology. As noted above both U.S. Pat. No. 4,500,382 to Foster, and U.S. Pat. No. 4,945,203 to Soodak disclose such a process with respect to resins or thin plastics although a vacuum tight weld or seal is not achieved. Likewise, simultaneous cutting and welding of metals is disclosed by U.S. Pat. No. 4,798,931 to Hess III, and U.S. Pat. No. 4,905,310 to Ulrich. The Hess III, and Ulrich patents, however teach that such methods do not work with very thin metals or foils.

Specifically, the Hess III and Ulrich patents disclose a method which "depends upon the creation of a globule or pool of molten metal, some of which is blown away and remainder of which is used to weld". The patents generally call for a space between the two layers to be welded. A narrow jet of air or inert gas is also required by the references to blow away some of the molten metal while some is left at the laser site. The spacing between the two metals to be welded is such that a globule of molten metal will bridge the gap and form a weld. In these two patents the focal point of the laser is set to be at the surface of the work, or below the surface. The patents suggest that for relatively thin materials the focal point be set at the surface of the work. The preferred embodiment of the patents is concerned with the welding of 321 stainless steel with a thickness of either 0.006 inches or 0.004 inches. No disclosure is made of an effective method for welding ultra-thin foils with a thickness of less than 0.002 inches. The references also do not disclose fixturing for directing heat away from the weld site to create pronounced weld beads.

As will be seen from the following description the process of the instant invention varies from that of the Hess III and Ulrich patents to satisfy a long felt need and achieve an improved result.

SUMMARY OF THE INVENTION

It is an object of the instant invention to provide a method for welding thin foils together, wherein the foils each have a thickness less than 0.002 inches.

It is a further object of the present invention to provide a method of welding very thin or ultra-thin metal foils wherein the method does not require the removal of globules of molten metal by jetted high-pressure gas or air, but rather prevents oxidation in air through the use of a low pressure shield gas.

It is another object of the instant invention to provide a method of simultaneously cutting and welding very thin foils.

It is a further object of the invention to provide a weld which can withstand atmospheric pressure and pliability tests, and to provide a weld with pronounced bead formation for use where vacuum integrity is required.

The instant invention relates to the method of simultaneously cutting and welding very thin metal sheets or foils. The method is suitable for use with metals having a thickness of less than 0.002 inches. The foils can be welded to provide an end to end overlapped configuration.

The method of the present invention comprises clamping and heat sinking two ultra-thin metal foils, providing a laser beam such as the beam from a pulsed Neodymium:YAG laser, providing suitable optics for focusing the laser on the foils to be cut and welded so that the focal point of the laser is above the surfaces of the foils to be cut and welded, pulsing the laser at specific speed and power settings to melt back material ahead of the laser path, and to partially solidify the melt between pulses of the laser, wherein the foils are melted together to form a strong, flaw resistant, vacuum-fight seal.

BRIEF DESCRIPTION OF THE DRAWINGS

FIG. 1 is a perspective view of a laser weld in accordance with a prior art method.

FIG. 2 is a perspective view in cross section of the welding and cutting of ultra-thin foils in accordance with the method of the instant invention.

FIG. 3 is a cross-sectional diagrammatic view of the apparatus used for welding and cutting of the ultra-thin foils.

FIG. 4 is a cross-sectional view of welded foils showing the weld bead.

FIG. 5 is a cross-sectional view of welded foils after the welded foils have been straightened to provide an end to end configuration

DETAILED DESCRIPTION OF THE PREFERRED EMBODIMENT

Prior art methods for welding metal foils using lasers produce a weld pool such as shown at 6 in prior art FIG. 1. In this method the laser 2, generally of the carbondioxide type, is used to weld metal sheets 3 and 4 together. The depth of the weld pool is difficult to maintain greater than the thickness of one foil but less than the thickness of both foils. A weld pool which penetrates both foils can become a hole when the surface tension of the weld pool draws the liquid metal away from the weld area. In this prior art embodiment, the weld area is typically limited by the thickness of the foils. In the past, in order to weld thin foils, globules or portions of the pool have been blown away using narrow jets of air or gases but this method has not been shown to be effective for ultra-thin foils (foils under 0.002 inches in width).

The present method, as shown in FIG. 2, also utilizes a laser 12 to weld ultra-thin foils 13 and 14 together. However, in the present case the laser is of the pulsed type and fixturing or clamping is provided for pronounced weld bead formation. The method of the instant invention utilizes the laser to simultaneously cut and weld the stacked foils. The laser, (shown at 12), is moved relative to the foils to simultaneously cut and weld to form channel 21. The laser 12 moves with precise speed and power to melt back material 17 ahead of the laser path, which material partially solidifies between pulses of the laser. The depth of penetration of the weld pool is not critical due to the cutting action, and the surface tension of the foils is sufficiently favorable to form beads 16 outlining the cut portions of the foils. The beads 16 are greater than the thickness of the foils helping to assure a tight seal without pinholes or defects, in order to provide a weld with vacuum integrity over its entire length.

To provide this precise cut and weld, a pulsed Neodymium: YAG laser is preferred although other solid state lasers can also be used. Prior art carbon dioxide lasers will not provide the precision required for the performance of the preferred method. Shorter wavelength lasers in contrast, provide favorable heat distribution which results in favorable surface tension of the melt pool and a thickened bead formation.

The Nd:YAG laser has a pulse duration in a range from 1 msec to 10 msec and a wavelength of 1.06 µm. The laser is pulsed from 20 to 100 pulses per sec. The average power level of the pulsed laser is from 20 to 100 watts. The laser is moved relative to the thin foils to be welded at a speed from about 1 to 10 inches per minute. The welding path can be controlled by either scanning the laser beam or moving the foils through a stationary beam. Any well known mechanical mechanism can be used along with the suitable electronic controls for performing the laser operation. Other suitable lasers include excimer lasers, argon ion lasers, and dye lasers. This fist is considered exemplary only and not construed to limit the lasers which could be used to practice the method of the invention.

Shorter wavelength lasers allow the laser beam to be optically focused to a more narrow spot size, which allows for more precise alignment and more accurate control of the thermal characteristics required for reliable, vacuum tight welds.

To form the preferred weld pool the method of the instant invention uses clamps 20, (shown schematically in FIG. 3), as heat sinks to distribute the heat and provide the requisite thermal characteristics. The clamps achieve this function due to their high thermal conductivity. Any suitable clamp which provides sufficient pressure on the foils can be used, as long as the clamp is also capable of drawing and conducting heat. If it is desirable to create a vacuum tight weld seal on only one edge of the cut, clamps 20 need to be placed only on one side of the weld area or channel 21. This will provide only one suitable edge weld. The clamp distance to form a good weld bead should be minimal and distances in a range from 0.003 inches to 0.015 inches away from the center of the cut channel. The weld bead produced is considerable thicker than the combined thicknesses of the two foils, that is, the welding of two 0.001 inch thick foils produces a weld bead approximately 0.003 inches to 0.050 inches thick.

The heat-sink clamp also helps shape the resulting weld bead by rapidly cooling the weld zone and eliminating damaging thermal stress and expansion problems.

The heat-sink clamps or fixturing can be water cooled to dispense the heat although other well known cooling methods, such as air methods, can also be used.

The instant invention uses auxiliary optics 19 to direct the laser beam. The focal point 18 of the laser is located above the surface of the top foil 13 as shown in FIG. 3. This preferred location for the focal point 18 provides a more uniform and controllable thermal distribution at the weld site. Such a focal point location also minimizes and controls damage to the lower side of the foils as they are trimmed in the simultaneous cutting and welding action. Also, laser energy dissipates more rapidly and safely beyond the weld area.

The process of the instant invention does not require jetting of air or gases to remove globules from the weld pool as is required with the prior art method of FIG. 1. Eliminating the jetting requirement can result in cost savings since frequently the gases used are rare and expensive. Also, jetting may be injurious to a leak-tight weld. Thus the instant process can be performed in a vacuum. To prevent oxidation, however, a low pressure shield gas (not shown) such as helium, nitrogen, or argon is preferably used. However, jetting of such gas would be detrimental to the achievement of a pronounced weld bead formation.

The pronounced bead formation of the instant invention results in a weld 22, formed of weld beads 16 which can be produced over long distances with vacuum tight integrity. The weld bead forms because the high intensity laser causes the thin foils to melt. The heat sink clamps quickly absorb the heat to create a weld bead size larger than the foil thickness. The pulse rate and relative rate of motion between the laser beam and the foils is controlled to assure that weld beads from sequential pulses overlap each other. The melt is partially solidified between the pulses of the laser to prevent uncontrolled heat build-up which can result in a variable welding pattern. Thus detrimental micro voids are prevented in the weld.

Although the process of the instant invention produces a lapped edge weld as shown in FIGS. 2 and 3, it can be used to achieve a weld comparable to a side by side lap weld. Thus, as shown in FIG. 4, the two foils, 13 and 14, can be separated and pivoted around weld bead 16 to achieve the configuration of FIG. 5. This weld is comparable to a conventional side by side lap weld. The configuration of FIG. 5 is only possible because of the ductability of the metal and the strength of the weld.

The following example is considered to be exemplary of the improved weld which can be achieved using the process of the instant invention. The example is not to be considered limiting but rather representative of the resulting weld integrity produced from the present method.

EXAMPLE

A focused Nd:YAG laser was used having a wavelength of 1.06 μm and a power of approximately 50 watts. The laser was pulsed at 40 pulses/sec with a 2 msec pulse duration. The laser was focused on two 0.001 inch type 304 stainless steel foils which were arranged one on top of the other as shown in FIG. 3. The weld and cut area was surrounded by nitrogen gas. Clamps were placed approximately 0.008 inches from the weld and cut line, both on top and below the foils to be welded as shown in FIG. 3. The laser was moved relative to the foils by scanning the laser over the area to be welded at cut a channel through the foils at a speed of 6"/minute. A weld was formed over the scanned distance. The weld was formed of pronounced beads having a diameter ranging from approximately 0.003 inches to 0.050 inches. The two foils having the resulting edge lap weld were separated to form a single sheet having a resulting side by side lap weld. The resulting single sheet was mounted to test the integrity of the weld between the two foils. The welded foil, was mounted for vacuum testing and further held a vacuum of approximately $1 \times 10^{-8}$ torr. The weld was also checked for leaks using a mass spectrometer and a helium source. No leakage of helium through the resulting weld was detected above $5 \times 10^{-10}$ atm. cc/sec.

The instant method is important for several diverse technologies. They include but are not limited to, the manufacture of vacuum insulation panels, as well as the manufacture of large-area heliostats which require welding of large sheets of metal foil. The process can also be used to splice sheared metal foils on site during the rolling process in steel mills. The process can also be used for welding foil seals for hydraulic and pneumatic systems. These examples are considered to be exemplary and are in no way limitations on the use of the instant method. Indeed the method can be used whenever it is desirable to weld ultra-thin metal foils for whatever purpose.

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow.

We claim:

1. A method of lap or side by side lap welding ultra-thin metal foils having a thickness of less than 0.002 inches comprising:

a) providing a first ultra-thin foil having a thickness of less than 0.002 inches, b) providing a second ultra-thin foil having a thickness of less than 0.002 inches, c) placing one of the ultra-thin foils on top of the other ultra-thin foil so that the foils are arranged in a stacked configuration, d) clamping the first and second foils together in a stacked configuration, e) providing a laser having a focused beam, f) directing the beam of the laser onto the stacked foils to cut portions of the stacked foils to form a channel outlined by the cut portions of the stacked foils, and to melt the cut portions of the stacked foils to form weld beads.

2. The method of claim 1 further comprising the step of moving the laser relative to the stacked foils to weld the stacked foils at successive overlapping locations to form a plurality of connected weld beads forming a continuous weld.

3. The method of claim 1 wherein said step of clamping further comprises using the clamps as heat sinks to absorb heat transmitted through the foils.

4. The method of claim 3 comprising the step of locating the clamps at a distance from 0.003 inches to 0.015 inches away from the center of the cut channel.

5. The method of claim 1 further comprising providing a Neodymium: YAG laser to cut the channel.

6. The method of claim 5 further comprising the step of pulsing the Neodymium: YAG laser to cut and melt the thin foils.

7. The method of claim 4 wherein the laser is pulsed from 20 to 100 pulses per second.

8. The method of claim 5 wherein the laser has a pulse width from 0.5 msec to 10 msec.

9. The method of claim 5 wherein said step of providing a Neodymium:YAG laser further comprises providing a Neodymium: YAG laser having an average power level in a range from 20 to 100 watts.

10. The method of claim 9 comprising providing focus optics to locate the focal point of the laser above the top surface of the stacked foils.

11. The method of claim 1 further comprising the step of providing a low pressure nonreactive gas shield around the cut channel of the thin foils.

12. The method of claim 1 further comprising the step of moving the laser relative to the thin foils to form a cut and weld path.

13. The method of claim 1 further comprising the steps of a) separating the stacked thin foils, and b) rotating the stacked thin foils around the weld beads to form a continuous sheet.

14. The method of welding two ultra-thin foils having a thickness of less than 0.002 to form a laser tight seal, comprising a) providing a first ultra-thin foil having a thickness of less than 0.002 inches;

b) providing a second ultra-thin foil having a thickness of less than 0.002 inches;

c) placing one of the ultra-thin foils on top of the other ultra-thin foil so that the foils are arranged in a stacked configuration;

d) providing a laser having a focused beam;

e) moving the laser relative to the foils to cut a channel through the foils and to form overlapped weld beads outlining the channel wherein said overlapped weld beads form a vacuum tight weld.

15. The method of claim 14 wherein the thickness of the overlapped weld beads is greater than the thickness of the stacked overlapped foils.

16. The method of claim 15 further comprising the step of providing clamps spaced from the channel to be cut wherein the clamps act as heat sinks to absorb heat transmitted through the foils.

17. The method of claim 14 further comprising the step of pulsing the laser to cut the channel and form the weld beads.

18. The method of claim 14 wherein said laser is a Neodymium: YAG laser having a wavelength of 1.06 μm.

19. The method of claim 14 further comprising providing focus optics to provide the laser with a focal point above the surface of the stacked foils.

\* \* \* \* \*